United States Patent [19]

Bobst et al.

[11] 4,372,758
[45] Feb. 8, 1983

[54] DEGASSING PROCESS FOR REMOVING UNPOLYMERIZED MONOMERS FROM OLEFIN POLYMERS

[75] Inventors: Robert W. Bobst; Billy J. Garner, both of Charleston, W. Va.; Frederick W. Jacob, Balboa, Calif.

[73] Assignee: Union Carbide Corporation, Danbury, Conn.

[21] Appl. No.: 183,375

[22] Filed: Sep. 2, 1980

[51] Int. Cl.³ .............................................. B01D 19/00
[52] U.S. Cl. ........................................ 55/48; 55/52; 528/483
[58] Field of Search ............................ 55/48, 51–53; 526/77, 88, 352.2; 528/480, 483, 500

[56] References Cited

U.S. PATENT DOCUMENTS

| | | | |
|---|---|---|---|
| 2,982,763 | 5/1961 | McLeod | 528/483 |
| 3,039,864 | 6/1962 | Hess et al. | 55/53 X |
| 3,227,703 | 1/1966 | Copenhaver, Jr. et al. | 528/483 |
| 3,450,183 | 6/1969 | Hinton | 528/483 X |
| 3,585,164 | 6/1971 | Tucker | 528/483 X |
| 3,594,356 | 7/1971 | Hinton | 528/483 |
| 4,197,399 | 4/1980 | Noel et al. | 528/483 X |
| 4,206,300 | 6/1980 | Talsma et al. | 528/483 |
| 4,217,444 | 8/1980 | Pompon et al. | 528/483 X |
| 4,252,968 | 2/1981 | Govoni et al. | 528/483 |
| 4,260,398 | 4/1981 | Ransohoff | 55/53 X |

FOREIGN PATENT DOCUMENTS 1272778 5/1972 United Kingdom .

*Primary Examiner*—Robert H. Spitzer
*Attorney, Agent, or Firm*—Henry J. Renk; Clement J. Vicari; John A. Shedden

[57] ABSTRACT

A degassing or purging process is disclosed for the removal of unpolymerized gaseous monomers from solid olefin polymers. The disclosed process comprises conveying the solid polymer, e.g. in granular form, to the top of a purge vessel by means of an inert gas stream, feeding an inert gas stream to the bottom of the purge vessel and countercurrently contacting the solid polymer with the inert gas purge stream to strip away the gaseous monomers evolved from the solid polymer, and recycling a portion of the resulting stream to the purge vessel. In one embodiment, the recycle serves as the conveying gas and in another embodiment as the purge stream. The process is especially useful in purging gaseous unpolymerized hydrocarbon monomers from low pressure-polymerized, low density ethylene-hydrocarbon copolymers.

11 Claims, 4 Drawing Figures

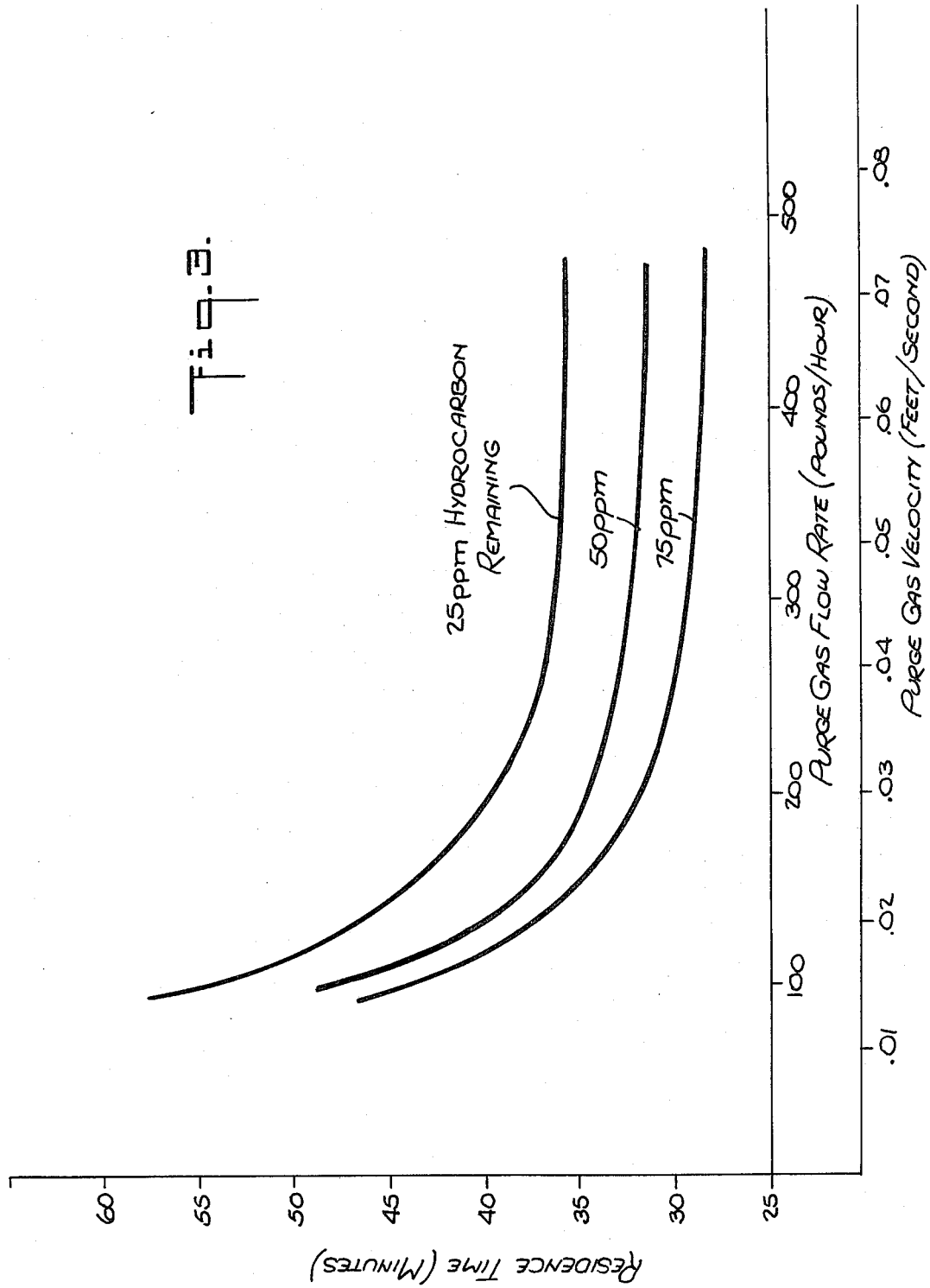

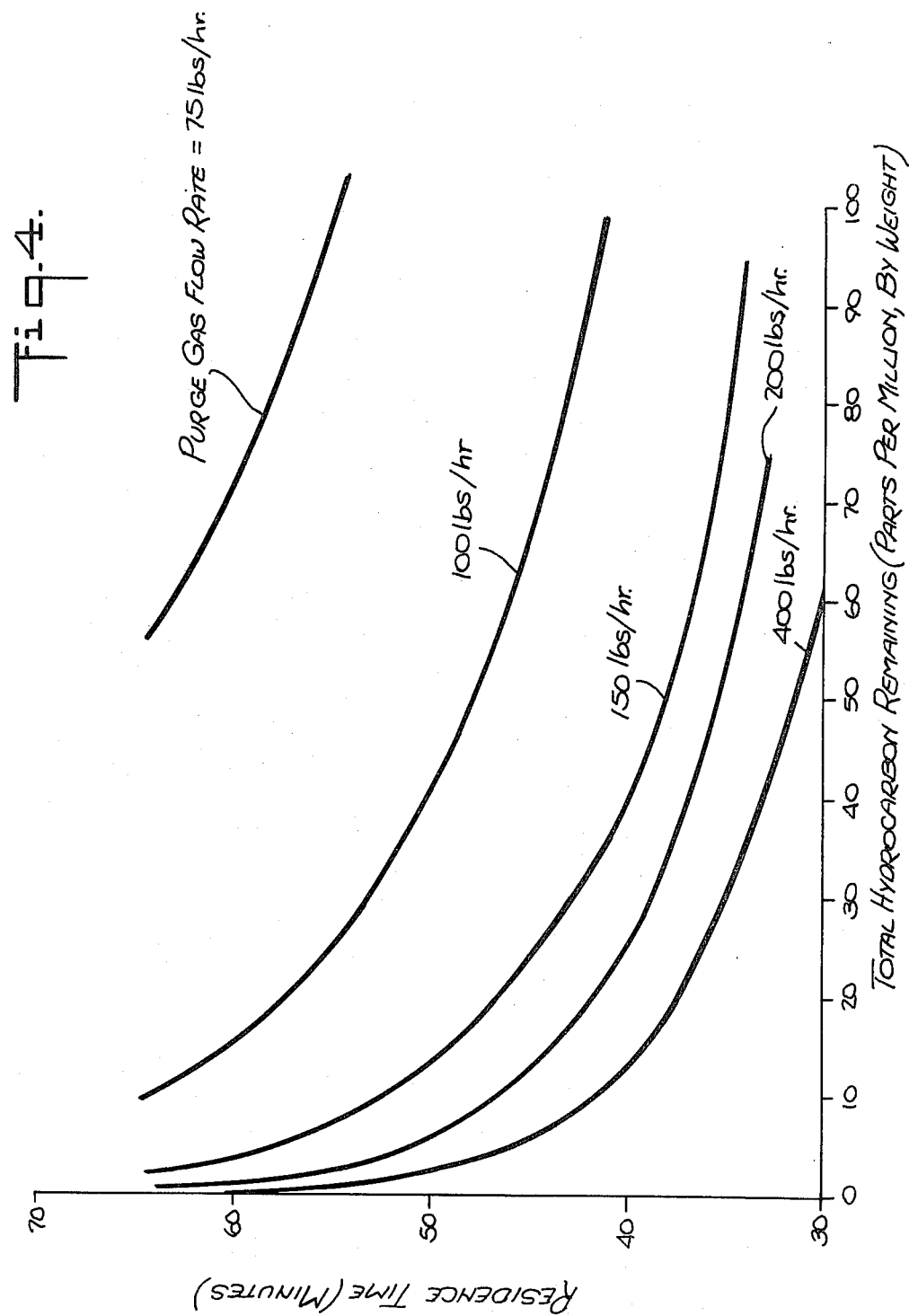

DEGASSING PROCESS FOR REMOVING UNPOLYMERIZED MONOMERS FROM OLEFIN POLYMERS

BACKGROUND OF THE INVENTION

1. Field of the Invention

The present invention relates to a process for removing unpolymerized gaseous monomers from solid olefin polymers; and more particularly and in a preferred embodiment, to a process for removing unpolymerized gaseous hydrocarbon monomers from granular, low pressure-polymerized, low density ethylene-hydrocarbon polymers.

2. Description of the Prior Art

Low density ethylene polymers (i.e., ethylene polymers having a density of about 0.94 g/cc and lower) have in the past been made commercially by a high pressure (i.e., at pressures of 15,000 psi and higher) homopolymerization of ethylene in stirred and elongated tubular reactors in the absence of solvents using free radical initiators. Recently, low pressure processes for preparing low density ethylene polymers have been developed which have significant advantages as compared to the conventional high pressure process. One such low pressure process is disclosed in commonly-assigned, copending U.S. applications Ser. No. 892,322, filed Mar. 31, 1978, now abandoned, and Ser. No. 12,720, filed Feb. 16, 1979, now U.S. Pat. No. 4,302,565, the disclosures of which are hereby incorporated herein by reference (a foreign-filed application corresponding thereto has been published as European Patent Publication No. 4647). Ethylene polymers made by such a low pressure process may be formed into film by known techniques and such film is extremely tough and is useful in packaging applications.

The above-identified copending applications disclose a low pressure, gas phase process for producing low density ethylene copolymers having a wide density range of about 0.91 to about 0.94 g/cc and a melt flow ratio of from about 22 to about 36 and which have a relatively low residual catalyst content and a relatively high bulk density. The process comprises copolymerizing ethylene with one or more $C_3$ to $C_8$ alpha-olefin hydrocarbons in the presence of a high activity magnesium-titanium complex catalyst prepared under specific activation conditions with an organo aluminum compound and impregnated in a porous inert carrier material. The copolymers (as applied to these polymers, the term "copolymers" as used herein is also meant to include polymers of ethylene with 2 or more comonomers) thus prepared are copolymers of predominantly (at least about 90 mole percent) ethylene and a minor portion (not more than 10 mole percent) of one or more $C_3$ to $C_8$ alpha-olefin hydrocarbons which should not contain any branching on any of their carbon atoms which is closer than the fourth carbon atom. Examples of such alpha-olefin hydrocarbons are propylene, butene-1, hexene-1, 4-methyl pentene-1 and octene-1.

The catalyst may be prepared by first preparing a precursor from a titanium compound (e.g., $TiCl_4$), a magnesium compound (e.g., $MgCl_2$) and an electron donor compound (e.g., tetrahydrofuran) by, for example, dissolving the titanium and magnesium compounds in the electron donor compound and isolating the precursor by crystallization. A porous inert carrier (such as silica) is then impregnated with the precursor such as by dissolving the precursor in the electron donor compound, admixing the support with the dissolved precursor followed by drying to remove the solvent. The resulting impregnated support may be activated by treatment with an activator compound (e.g. triethyl aluminum).

The polymerization process may be conducted by contacting the monomers, in the gas phase, such as in a fluidized bed, with the activated catalyst at a temperature of about 30° to 105° C. and a low pressure of up to about 1000 psi (e.g., from about 150 to 350 psi).

The resulting granular polymers may contain gaseous unpolymerized monomers including hydrocarbon monomers. These gaseous monomers should be removed from the granular resin for safety reasons, since there is a danger of explosion if the hydrocarbon monomer concentration becomes excessive in the presence of oxygen. In addition, proper disposal of the hydrocarbons is required in order to meet environmental standards concerning hydrocarbon emissions.

The prior art teaches techniques for removing volatile unpolymerized monomers from polymers of the corresponding monomers. For example, U.S. Pat. No. 4,197,399 discloses a process for removing residual vinyl chloride monomer present after polymerization of vinyl chloride polymers in the form of an aqueous dispersion. The process comprises heating the polymer at least to its glass transition temperature and stripping the polymer at the elevated temperature by an inert fluid such as air, nitrogen or steam.

U.S. Pat. No. 3,594,356 discloses a polymer recovery process for the removal of polymer from solvent. After an initial flashing operation and sizing the resulting solid polymer particles, the polymer is purged in two stages with an inert gas such as nitrogen. Any unreacted monomer may be removed by venting and/or flashing.

U.S. Pat. No. 3,450,183 discloses a process for the recovery of polyolefin solids from a solution containing same, which comprises flashing to obtain a solid concentrate and thereafter subjecting the chopped solids to a mixing action countercurrent to a stream of inert purge gas such as nitrogen. Any unreacted olefin can be removed by venting and/or flashing.

SUMMARY OF THE INVENTION

The present invention is a degassing or purging process for removing unpolymerized gaseous monomers from solid olefin polymers. Specifically, the process of the present invention comprises conveying the solid polymer (e.g., in granular form) to a purge vessel by means of an inert gas stream, contacting the polymer in the purge vessel with a countercurrent inert gas purge stream to strip away the monomer gases which are evolved from the polymer, and recycling a portion of the resulting inert gas-monomer gas stream to the purge vessel. In one embodiment, the recycled stream serves as the conveying stream to feed the polymer to the purge vessel. In another embodiment, the recycled stream serves as the purge stream fed to the bottom of the purge vessel. In a preferred embodiment, gaseous unpolymerized hydrocarbon monomers may be purged from granular, low pressure-polymerized-low density ethylene-hydrocarbon copolymers by the process of the invention.

BRIEF DESCRIPTION OF THE DRAWINGS

FIGS. 3 and 4 illustrate the variation in residence times with purge flow rates and final monomer concentrations.

DESCRIPTION OF THE PREFERRED EMBODIMENTS

Figure 1:
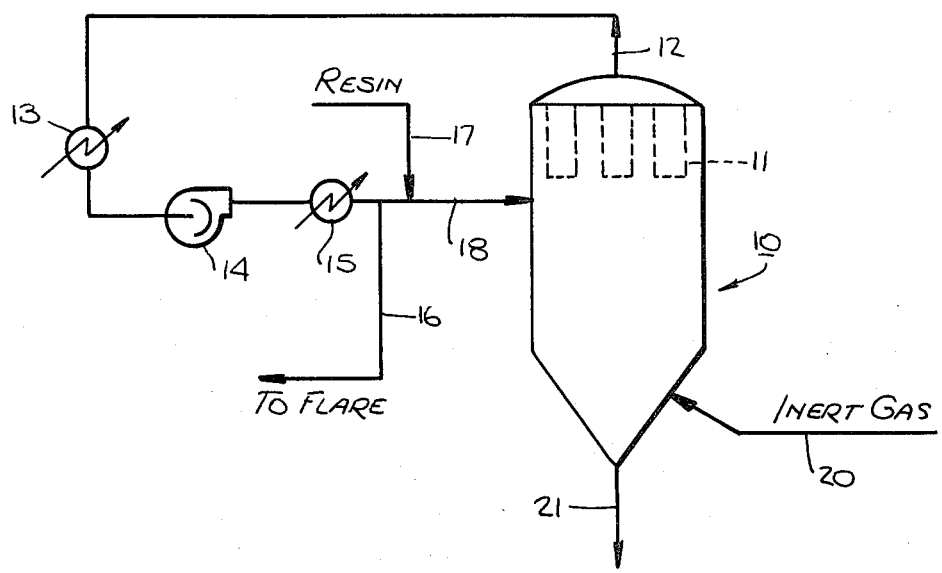
FIGS. 1 and 2 illustrate different embodiments of the present invention.

For purposes of ease of description only, the present invention will be described herein with reference to low pressure-low density ethylene copolymers, although it is to be expressly understood that the invention is not to be limited thereby. Rather, it is the intention to be limited only by the scope of the claims appended hereto. For example, the gas purging process of the present invention may be employed to purge solid olefin polymers other than low pressure-low density ethylene copolymers, such as homopolymers of ethylene and propylene and other copolymers of ethylene.

As used herein, the language "low pressure-low density ethylene copolymers" means copolymers of at least about 90 mole percent ethylene with no more than about 10 mole percent of at least one $C_3$ to $C_8$ alpha-olefin hydrocarbon comonomer (e.g., propylene, butene-1, hexene-1, 4-methyl pentene-1 and octene-1) which are copolymerized under low pressure (e.g., 150 to 350 psi). Such copolymers normally have a density no greater than about 0.94 g/cc and typically their density is from about 0.91 to about 0.94 g/cc. In addition, such copolymers generally have a narrow molecular weight distribution range (Mw/Mn) of about 2.7 to 4.5. A specific example of one method for preparing such copolymers is more fully described in the aforementioned copending U.S. applications Ser. Nos. 892,322 and 12,720, and reference may be made to such applications for a more complete disclosure. The gas phase process disclosed in those applications produces granular polymers which may have an average particle size diameter on the order of about 0.03 to about 0.05 inch.

Depending upon the conditions of reaction and the particular hydrocarbon comonomer, the resulting solid low pressure-low density ethylene copolymers may contain an amount of gaseous unpolymerized monomers (which may include ethylene, one or more of the hydrocarbon comonomers, saturated hydrocarbons and non-reactive hydrocarbon olefins) which may be as high as about 1.5 to 4.5 weight percent. Environmental restrictions may prevent the direct venting to the atmosphere of such hydrocarbons and more importantly, safety considerations generally require the hydrocarbon content to be reduced to avoid the possibility of explosion upon contact with oxygen. The present invention may be employed to accomplish these desired objectives.

Broadly, the process of the present invention comprises countercurrently contacting the solid resin particles containing the unpolymerized monomer gases with an inert gas purge stream whereby the monomer gases evolve from the resin particles and are stripped away by the purge stream; and recycling a portion of the resulting gas stream to the purging step. The process is normally performed in a continuous fashion although it is possible to perform it batchwise as well.

The process of the present invention is believed to involve only a physical process, i.e., the monomer gases are only entrained or otherwise contained within and between the resin particles and diffuse out into the countercurrent gas purge stream. The diffusion of the monomer gases into the purge gas occurs until an equilibrium is established between the monomer concentration in the resin and in the purge gas. A large difference between monomer concentrations in the resin and in the purge stream obviously favors a high rate of diffusion. In addition, the rate of diffusion is dependent to a degree upon the temperature and pressure within the purge vessel, with higher temperatures favoring higher diffusion rates and therefore lower residence times in the purge vessel and with lower pressures also favoring higher rates of diffusion. The rate of diffusion also depends on the resin particle size and particle morphology, with the rate being higher for smaller particle sizes. Therefore, depending upon the initial monomer concentration in the resin and the final concentration desired, the residence time of the resin in the purge vessel can be determined using known mass transfer techniques based on the resin temperature, particle size distribution and morphology, rate of flow of purge gas, the pressure in the purge vessel, and the size of the purge vessel. For low pressure-low density ethylene copolymers, a residence time on the order of about 50 minutes is generally preferred to reduce the hydrocarbon monomer concentration to a safe and environmentally-acceptable value. It is preferred to feed to the purge vessel a purge gas which contains as little as possible or no hydrocarbons. Of course, economic considerations also affect the design of the purge vessel. Those skilled in the art will be able to practice the present invention based upon the more detailed discussions contained hereinbelow and using standard chemical engineering techniques. FIG. 4 of the drawings demonstrates the ideal residence times necessary to achieve certain hydrocarbon concentrations in a resin at the conclusion of purging for certain purge gas flow rates. The data is based on a low pressure-polymerized ethylene-1-butene copolymer having a density of 0.918 g/cc, a 2.0 Melt Index, a starting temperature of about $80° \geqq 85°$ C., an initial hydrocarbon concentration of 13820 ppm by weight (i.e., 1.38% by weight) and pure nitrogen as the purge gas. The curves show that the residence time necessary to achieve a certain final hydrocarbon concentration decreases with increasing purge gas flow rates.

The drawings illustrate two embodiments of the process of the present invention. Referring to FIG. 1, a purge vessel or tank 10 is shown which is provided with conventional dust collectors 11. An inert gas purge is fed via stream 20 to the bottom of purge vessel 10 and a solid resin is conveyed in an inert gas via stream 18 to the top thereof. The resin is fed to the purge vessel 10 and the purge vessel is designed such that the resin flows downwardly through the vessel in substantially plug flow fashion. By "plug flow" is meant equal movement of the resin particles throughout a cross-section of the purge vessel such that all of the resin particles have a substantially equal residence time in the vessel.

The inert gas purge flows upwardly through the purge vessel countercurrently against the resin and sweeps away the gaseous monomers which evolve from the resin. The resulting gas stream 12 exiting from purge vessel 10 contains the purge gas, the conveying gas and evolved monomer gases and a portion thereof is recycled back to purge vessel 10 as the resin conveying gas. As shown in FIG. 1, stream 12 is fed sequentially through a cooler 13, blower 14 and cooler 15 (which is optional depending upon the design of the blower) after which one portion thereof is vented to a flare via stream 16 and resin is added via stream 17 to the remaining portion thereof which is employed as the conveying stream 18. The purged resin exits purge vessel 10 via stream 21, having a reduced monomer gas content.

Figure 2:
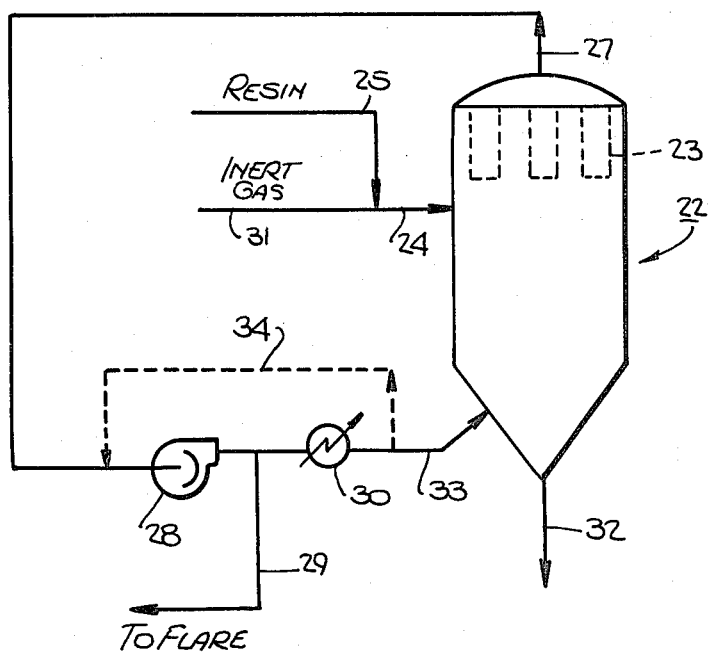

An alternate embodiment is shown in FIG. 2 of the drawings, where the gas recycle is used as the purge gas instead of the resin conveying gas as in FIG. 1. Referring to FIG. 2, resin is fed via stream 25 to an inert gas stream 31 and the resin is conveyed to purge vessel 22 by the inert gas via stream 24. The countercurrent contact of purge gas and resin (flowing in plug flow fashion) in purge vessel 22 produces a gas mixture exiting purge vessel 22 via stream 27 which contains conveying gas, purge gas and evolved gaseous monomers and a reduced monomer gas-content resin exiting via stream 32. Part of gas stream 27, downstream of a blower 28, is fed to a flare via stream 29 and the remaining portion, after cooling in a cooler 30, is recycled to purge vessel 22 as purge gas via stream 33. Conventional dust collectors 23 may be provided within purge vessel 22 as in the embodiment of FIG. 1.

Conventional materials handling equipment and techniques may be employed in the process of the present invention. It is preferred, however, to use a purge vessel which has a conical-shaped bottom as shown schematically in the drawings. In this case, in order to obtain the preferred plug flow of resin, it may be necessary to utilize an inverted conical insert or other means inside the bottom of the purge vessel. The height of this insert may be adjusted in order to provide the desired effect. Such inserts are commercially available. The purpose of the dust collectors, which are also preferred, is to prevent the resin particles from being carried out of the top of the purge vessel with the exiting purge gas. Conventional dust collectors, such as commercially-available bag filters, may be employed. Similarly, conventional coolers and blowers may be employed to provide the necessary materials handling capability and to control the temperature and pressure of resin and purge gas.

The temperature of the resin in the purge vessel is not critical and is normally dependent upon the temperature at which it is obtained from the polymerization reaction. However, the resin temperature affects the residence times as discussed below. In the case of low pressure-low density ethylene copolymers, the resin may be obtained in the form of solid particles directly from the polymerization reaction at a temperature of about 80°–85° C. It is economically desirable not to add additional heat to the resin before feeding same to the purge vessel. It is also necessary to keep the resin temperature lower than its softening or melting point which in the case of low pressure-low density ethylene copolymers is about 100°–110° C. As indicated above, the higher the temperature in the purge vessel, the higher the rate of diffusion of the monomer gases from the solid to the purge gas. However, economic considerations may prevent additional heat from being added to the resins. Satisfactory results can be obtained by directly feeding the resin at its reaction temperature to the purging operation, even considering the fact that its temperature may decrease or increase slightly due to the temperature of the conveying gas.

The inert purge gas is preferably fed to the bottom of the purge vessel at ambient temperature although any temperature up to about the temperature of the resin is acceptable. It is also preferred to provide a low positive pressure in the purge vessel since the rate of gaseous monomer diffusion is higher at lower pressures. It is however also preferred to maintain a positive pressure in the purge vessel and to avoid a vacuum since any vacuum may have the effect of drawing into the system air or oxygen which would create safety problems in view of the explosive nature of the hydrocarbon monomers at higher concentrations. Although the proper pressure depends on many factors, those skilled in the art are capable of making that determination using known mass transfer techniques. In the case of low pressure-low density ethylene copolymers, the pressure of the purge vessel fed to the bottom of the purge vessel is preferably about 1 psig although it may be as high as 15 psig or greater.

It is also preferred to provide a gas barrier means at the resin outlet from the purge vessel (e.g., in streams 21 and 32 in FIGS. 1 and 2, respectively) to prevent air or oxygen from entering the purge vessel. Such gas barrier means may be any device which prevents upflow of air into the purge vessel.

It is also preferable to provide as uniform a flow of purge gas through the vessel as possible. To achieve this, it may be necessary to provide a plurality of uniformly-spaced openings or other flow distribution devices in the bottom of the purge vessel for feeding the purge gas. In addition, it is preferred to feed the purge gas through the vessel at or above a minimum velocity in order to obtain a more uniform distribution of purge gas. For purposes of the present invention, it is preferred to feed the purge gas through at a rate of at least about 1 linear foot per minute. FIG. 3 of the drawings demonstrates the theoretical sensitivity of purge rate (using pure nitrogen as the purge gas) on the residence time required to reach a specified hydrocarbon concentration in a resin (a low pressure-polymerized ethylene-1-butene copolymer; density=0.918 g/cc; 2.0 Melt Index). The curves in FIG. 3 show that the residence time decreases with increasing purge rate and increasing purge velocity, although the rate of decrease of residence time slows significantly with increasing purge rates and velocities.

The rate of flow of resin through the purge vessel is not critical and depends upon the minimum residence time necessary to reduce the concentration of gaseous monomers in the resin to the desired level. It is preferred to reduce the hydrocarbon monomer gas content in the resin to below about 25-50 parts per million by weight, although the extent to which the hydrocarbon monomer concentration must be reduced depends upon both environmental and safety requirements. In any event, the purging process of the present invention is effective to substantially reduce the hydrocarbon monomer gas content of low pressure-low density ethylene copolymer resins.

The inert gas employed in the practice of the present invention may be any gas which is inert both to the resin being purged and the particular gaseous monomers being removed. The preferred purge gas is nitrogen although other gases inert in the process may be employed. It is preferred that the nitrogen content of the purge gas be at least about 90% and that oxygen be excluded from the purge gas. The maximum permissible oxygen content varies depending upon the particular hydrocarbon monomer gas being stripped. As the concentration of hydrocarbons increases in the presence of oxygen, the danger of explosion also increases, and this level varies with different hydrocarbons. Ideally, there should be no oxygen in the purge gas although a small amount can be tolerated depending upon the hydrocarbon concentration in the purge vessel and the monomers being stripped. Those skilled in the art can easily determine the tolerable oxygen levels given a particular monomer. Of course, the inert purge gas may also include small amounts of the gaseous monomers, although as their concentration increases, their diffusion rate and hence the resin residence time will be affected as discussed above. Other advantages of employing relatively pure nitrogen as a purge gas are that more hydrocarbon gases can be stripped from the resin particles and any pure nitrogen that may be discharged with the exiting resins does not contribute to atmospheric emissions as would gases containing impurities. It is therefore preferred that the purge gas be pure nitrogen and accordingly the embodiment shown in FIG. 1 of the drawings is preferred over that of FIG. 2. In the latter, the recycle purge gas stream contains some evolved monomer gases thus lowering the extent to which the monomers gas concentration in the resin can be reduced.

EXAMPLE I

An ethylene-1-butene copolymer (density = 0.918 g/cc; 2.0 Melt Index) is prepared by the gas phase process disclosed in the copending applications described above. Using apparatus set up as shown in FIG. 1, the copolymer particles are purged with pure nitrogen. The mass balance is shown in Table I below.

TABLE I

| Component/Stream | 12 | 16 | 17 | 18 | 21 |
|---|---|---|---|---|---|
| Nitrogen (pounds per hour) | 2157 | 160 | 85 | 2082 | 86 |
| Resin (thousands of pounds per hour) | 0 | 0 | 13.2 | 13.2 | 13.2 |
| Hydrocarbon in Resin (lbs. per lb. of resin) | | | | | |
| Ethylene | 0 | 0 | .00235 | .00235 | 0 |
| Butene | 0 | 0 | .01140 | .01140 | .000049 |
| non-reactive hydrocarbons | 0 | 0 | .00007 | .00007 | .000001 |
| Hydrocarbon in Gas (lbs. per hour) | | | | | |
| Ethylene | 1218 | 91 | 60 | 1187 | 0 |
| Butene | 3048 | 223 | 72 | 2897 | 0 |
| non-reactive hydrocarbons | 53 | 4 | 3 | 52 | 0 |

The typical temperatures and pressures for the respective streams are shown in Table II below.

TABLE II

| Stream | 12 | | | 16 | 17 | Top of Purge Vessel | 20 | 21 |
|---|---|---|---|---|---|---|---|---|
| | Before Cooler | Blower Suction | Blower Exhaust | | | | | |
| Temp. (°C.) | 85 | 60 | 81 | 65 | 85 | 85 | ambient | 80 |
| Pres. (psig) | 0.8 | 0.8 | 5 | 1 | 6 | 1 | 2 | 2 |

TABLE II-continued

| Stream | 12 | 16 | 17 | Top of Purge Vessel | 20 | 21 |
|---|---|---|---|---|---|---|
| (psig) | | | | | | |

EXAMPLE II

The procedure of Example I is repeated except that larger amounts of resin are processed. The mass balance is shown in Table III below and the typical temperatures and pressures are shown in Table IV below.

TABLE III

| Component/Stream | 12 | 16 | 17 | 18 | 21 |
|---|---|---|---|---|---|
| Nitrogen (pounds per hour) | 2629 | 61 | 39 | 2529 | 23 |
| Resin (pounds per hour) | 0 | 0 | 22500 | 22500 | 22500 |
| Hydrocarbon in Resin (lbs. per lb. of resin) | | | | | |
| Ethylene | 0 | 0 | .00235 | .00235 | 0 |
| Butene | 0 | 0 | .01140 | .01140 | .000049 |
| non-reactive hydrocarbons | 0 | 0 | .00007 | .00007 | .000001 |
| Hydrocarbon in Gas (lbs. per hour) | | | | | |
| Ethylene | 1393 | 32 | 21 | 1340 | 0 |
| Butene | 6757 | 158 | 100 | 6500 | 0 |
| non-reactive hydrocarbons | 52 | 1 | 1 | 50 | 0 |

TABLE IV

| Stream | 12 | | | 16 | 17 | Top of Purge Vessel | 20 | 21 |
|---|---|---|---|---|---|---|---|---|
| | Before Cooler | Blower Suction | Blower Exhaust | | | | | |
| Temp. (°C.) | 85 | 40 | 90 | 65 | 85 | 85 | ambient | 80 |
| Pres. (psig) | 0.8 | 0.8 | 6 | 1 | 6 | 1 | 2 | 2 |

EXAMPLE III

The same polymer as in Example I is polymerized and the apparatus of FIG. 2 is employed to purge the resin particles. The results are shown in Table V below.

TABLE V

| Description/Stream | 25 | 31 | 27 | 29 | 34* | 33 | 32 |
|---|---|---|---|---|---|---|---|
| Total Flow Rate (lbs/hr) | 35,160 | 11,000 | 12,300 | 11,500** | 400 | 800 | 35,000 |
| Nitrogen (lbs/hr) | — | 9,988 | 10,997 | 10,282 | 358 | 715 | — |
| Hydrocarbons (lbs/hr) | | | | | | | |
| Ethylene/Ethane | 16 | 132 | 165 | 154 | 5 | 10 | — |
| Butene | 131 | — | 135 | 126 | 4 | 9 | 5 |
| non-reactive hydrocarbons | 18 | — | 19 | 18 | 1 | 2 | — |
| Oxygen (lbs/hr) | — | 880 | 984 | 920 | 32 | 64 | — |
| Resin (lbs/hr) | 34,995 | — | — | — | — | — | 34,995 |
| Temperature (°C.) | 85 | 40 | 60 | 120 | 50 | 50 | 60 |
| Pressure (psig) | 15 | 15 | 0.1 | 5.0 | 1.1 | 1.1 | 9.5 |

*recycle to blower suction to prevent blower motor burnout
**includes 500 lbs/hr of $N_2$ leakage into purge vessel through stream 32

What is claimed is:

1. A process for removing unpolymerized gaseous monomers from a solid olefin polymer containing said gaseous monomers which comprises:
   conveying said polymer to a purge vessel in a first gas stream, said gas being inert to said polymer and monomers and containing substantially no oxygen;

feeding a purge gas to said purge vessel, said purge gas being inert to said resin and said monomers and containing substantially no oxygen;

countercurrently contacting said polymer and said purge gas in said purge vessel to produce a second gas stream containing said purge gas, said conveying gas and said gaseous monomers and a polymer stream having a reduced amount of said gaseous monomers; and recycling a portion of said second gas stream to said purge vessel.

2. A process according to claim 1, wherein said recycle stream is employed as said first gas stream.

3. A process according to claim 2, wherein said purge gas comprises nitrogen.

4. A process according to claim 1, wherein said recycle stream is employed as said purge gas.

5. A process according to claim 1, wherein said purge gas comprises nitrogen.

6. A process according to claim 1, wherein said polymer is a low pressure-polymerized, low density ethylene-hydrocarbon copolymer.

7. A process for removing unpolymerized gaseous monomers from a solid low pressure-polymerized, low density ethylene-hydrocarbon copolymer containing said gaseous monomers which comprises:

conveying said copolymer, in granular form, to the top of a purge vessel in a first gas stream and downwardly through said purge vessel in substantially plug flow fashion, said gas being inert to said copolymer and containing said gaseous monomers and substantially no oxygen;

feeding a purge gas to the bottom of said purge vessel, said purge gas being inert to said copolymer and containing substantially no oxygen and substantially none of the gaseous monomers being removed;

countercurrently contacting said copolymer and said purge gas in said purge vessel to produce a second gas stream containing said purge gas, said conveying gas and said gaseous monomers and a copolymer stream having a reduced amount of said gaseous monomers; and recycling a portion of said second gas stream as said first gas stream.

8. A process according to claim 7, wherein said purge gas comprises nitrogen.

9. A process according to claim 7, wherein said reduced amount is less than 50 parts by weight of said gaseous monomers per 1 million parts by weight of copolymer.

10. A process for removing unpolymerized gaseous monomers from a solid low pressure-polymerized, low density ethylene-hydrocarbon copolymer containing said gaseous monomers which comprises:

conveying said copolymer, in granular form, to the top of a purge vessel in a first gas stream and downwardly through said purge vessel in substantially plug flow fashion, said gas being inert to said copolymer;

feeding a purge gas to the bottom of said purge vessel, said purge gas being inert to said copolymer and containing said gaseous monomers;

countercurrently contacting said copolymer and said purge gas in said purge vessel to produce a second gas stream containing said purge gas, said conveying gas and a higher amount of said gaseous monomers and a copolymer stream having a reduced amount of said gaseous monomers; and recycling a portion of said second gas stream as said purge gas.

11. A process according to claim 10, wherein said first gas stream comprises at least 90% nitrogen.

* * * * *